(12) United States Patent
Yokoyama

(10) Patent No.: US 9,321,350 B2
(45) Date of Patent: Apr. 26, 2016

(54) VEHICLE

(75) Inventor: Shinichi Yokoyama, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 399 days.

(21) Appl. No.: 13/989,342

(22) PCT Filed: Nov. 4, 2011

(86) PCT No.: PCT/JP2011/075440
§ 371 (c)(1),
(2), (4) Date: May 23, 2013

(87) PCT Pub. No.: WO2012/081330
PCT Pub. Date: Jun. 21, 2012

(65) Prior Publication Data
US 2013/0249283 A1      Sep. 26, 2013

(30) Foreign Application Priority Data

Dec. 14, 2010 (JP) ................................. 2010-278535

(51) Int. Cl.
*B60L 1/00* (2006.01)
*H01M 10/44* (2006.01)
(Continued)

(52) U.S. Cl.
CPC . *B60L 1/00* (2013.01); *B60L 3/003* (2013.01); *B60L 3/0046* (2013.01); *B60L 3/0069* (2013.01); *B60L 3/04* (2013.01); *B60L 11/1803* (2013.01); *B60L 11/185* (2013.01); *B60L 11/1816* (2013.01); *B60L 11/1868* (2013.01); *H01M 10/44* (2013.01); *H01M 10/48* (2013.01); *H02J 7/0029* (2013.01); *B60L 2210/10* (2013.01); *B60L 2210/30* (2013.01);
(Continued)

(58) Field of Classification Search
None
See application file for complete search history.

(56) References Cited

U.S. PATENT DOCUMENTS

2010/0072953 A1    3/2010   Mitsutani
2010/0141213 A1    6/2010   Iida

FOREIGN PATENT DOCUMENTS

JP    2008-306823 A    12/2008
JP    2009-189154 A     8/2009
(Continued)

OTHER PUBLICATIONS

International Search Report issued in PCT/JP2011/075440, mailed Jan. 24, 2012, 4 pages.

*Primary Examiner* — Jared Fureman
*Assistant Examiner* — Aqeel Bukhari
(74) *Attorney, Agent, or Firm* — Squire Patton Boggs (US) LLP

(57) ABSTRACT

A vehicle includes a connection wire which is provided at the vehicle, an electricity storage device, an external charging system, which charges the electricity storage device with power received from an external power supply through the connection wire, an auxiliary machinery load which is connected to the connection wire, a current sensor which measures au inflow current value into the electricity storage device and an outflow current value from the electricity storage device, an auxiliary machinery current consumption measurement unit which measures a current value to be consumed by the auxiliary machinery load, and a control device which, estimates the inflow current value from the external power supply based on a measurement result of the current sensor and a measurement result of the auxiliary machinery current consumption measurement unit while the electricity storage device is being charged with power received from the external power supply.

12 Claims, 3 Drawing Sheets

(51) Int. Cl.
*H01M 10/48* (2006.01)
*H02J 7/00* (2006.01)
*B60L 3/00* (2006.01)
*B60L 3/04* (2006.01)
*B60L 11/18* (2006.01)

(52) U.S. Cl.
CPC ....... *B60L 2210/40* (2013.01); *B60L 2240/527* (2013.01); *B60L 2240/529* (2013.01); *B60L 2240/549* (2013.01); *B60L 2250/10* (2013.01); *B60L 2250/16* (2013.01); *B60L 2270/20* (2013.01); *Y02T 10/7005* (2013.01); *Y02T 10/7066* (2013.01); *Y02T 10/7072* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(56) References Cited

FOREIGN PATENT DOCUMENTS

| | | |
|---|---|---|
| JP | 2009-225587 A | 10/2009 |
| JP | 2010-81677 A | 4/2010 |

VEHICLE

CROSS-REFERENCE TO RELATED APPLICATIONS

This application is a National Stage entry of International Application No. PCT/JP2011/075440, filed Nov. 4, 2011, which claims priority to Japanese Application No. 2010-278535, filed Dec. 14, 2010. The disclosures of the prior applications are hereby incorporated in their entirety by reference.

TECHNICAL FIELD OF THE INVENTION

The present invention relates to a vehicle which includes an electricity storage device capable of being charged from an external power supply.

Priority is claimed on Japanese Patent Application No. 2010-278535, filed Dec. 14, 2010, the content of which is incorporated herein by reference.

BACKGROUND ART

In the related art, vehicles, such as electric vehicles, which drive a motor with power from an electricity storage device, a vehicle in which an electricity storage device is capable of being charged by an external power supply provided outside the vehicle, such as a parking lot, is known (for example, see Patent Document 1).

PRIOR ART DOCUMENTS

Patent Documents
Patent Document 1: Japanese Unexamined Patent Application First Publication No. 2009-189154

SUMMARY OF THE INVENTION

Problems to be Solved by the Invention

In recent years, there has been a demand for quick charging electricity storage devices, and IN a quick charger, unified standards, such as the CHAdeMO standard, have been suggested. In the quick charging, when an abnormality, such as a layer short, occurs on the vehicle, if is necessary to stop charging on the vehicle side. For this reason, for example a current sensor is provided near a power receiving port of the vehicle to detect an inflow current, and thereby determining an occurrence of abnormality at the vehicle. The entire inflow current which is detected by the current sensor near the power receiving port does not contribute to the charging of the electricity storage device, and a current flows into discharge resistance of a capacitor which is provided in front of a DC/DC converter or a motor inverter to be operated during the charging. For this reason, in order to accurately understand an accurate charging state of the electricity storage device, a current sensor is provided in a connection wire immediately near the electricity storage device to which nothing is branch connected. Accordingly it is necessary to provide a plurality of current sensors on the vehicle, and there is a problem that due to the increases of the number of components, cost and vehicle weight increases.

The invention has been accomplished in consideration of the above-described situation, and an object of the invention is to provide a vehicle which can reliably detect an abnormality on the vehicle side while suppressing an increase in cost and achieving a reduction in weight.

Means for Solving the Problems

In order to solve the above-described problems, the following configuration is implemented.

That is, (1) a vehicle according to an aspect of the invention includes a connection wire and an electricity storage device, an external charging system which charges the electricity storage device with power received from an external power supply through the connection wire, an auxiliary machinery load which is connected to the connection wire, a current sensor which assures an inflow current value into the electricity storage device and an outflow current value from the electricity storage device, an auxiliary machinery current consumption measurement unit which measures a current value to be consumed by the auxiliary machinery load, and a control device which estimates the inflow current value iron) the external power supply based on a measurement result of the current sensor and a measurement result of the auxiliary machinery current consumption measurement unit while the electricity storage device is being charged with power received from the external power supply.

(2) The vehicle according to (1) may further include a voltage sensor which measures a voltage value of the connection wire, a first contactor which is provided between the electricity storage device and the connection wire, a second contactor which is provided between a vehicle-side connector, to which the external power supply is connected, and the connection wire, a resistor, and a third contactor which is connected in series to the resistor and provided to bypass the first contactor, wherein the control device receives information regarding a current value of a current flowing out from the external power supply, when deviation between the current value and an estimated value of the inflow current is greater than or equal to a predetermined value, places the first contactor and the second contactor in an open state and the third contactor in a closed state and determines whether or not a voltage value of the connection wire is abnormal voltage, and when, it is determined that the voltage value is abnormal voltage, determines that the vehicle side is responsible for occurrence of the abnormal voltage.

(3) to the vehicle of (2), when it is determined that a voltage value of the connection wire is not an abnormal voltage the control device may place the second contactor and the third contactor in an open state and the first contactor in a closed state and may determine whether or not a measured current of the current sensor is abnormal current, and when it is determined that the measured current is abnormal current, may determine that the vehicle side is responsible for occurrence of the abnormal current.

(4) In the vehicle of (2) when it is determined that abnormality occurs at the vehicle side, the control device may place the second contactor and the third contactor in an open state and the first contactor in a closed state, may activate the auxiliary machinery load, and may determine whether or not a voltage value of the connection Wire is abnormal voltage, and when it is determined that the voltage value is abnormal voltage, may determine that the auxiliary machinery load is abnormal.

(5) In any one of the aspects described in (1) to (4), the auxiliary machinery current consumption measurement unit may measure a current value to be consumed by the auxiliary machinery load based on the measurement result of a current sensor provided at an input side of the auxiliary machinery load.

(6) In any one of the aspects described in (1) to (4), the auxiliary machinery current consumption measurement unit may measure a current value to be consumed by the auxiliary machinery load based on an output current value of the auxiliary machinery load and an efficiency map based on the output current value and an output voltage value.

Effect of the Invention

With the vehicle according to the aspect (1) of the invention, the inflow current from the external power supply is estimated using the current sensor and the auxiliary machinery current consumption measurement unit whereby a dedicated current sensor which detects the inflow current from the external power supply can be omitted. For this reason it is possible to reduce the number of components to suppress an increase in costs, and to reliably detect an abnormality on the vehicle side while achieving a redaction in weight.

With the vehicle according to the aspect (2) of the invention, in addition to the effects of the vehicle of (1), when deviation between information regarding the current value of the current flowing out from the external power supply and the estimated value of the inflow current is greater than or equal to a predetermined value, the first contactor and the second contactor are placed in an open state, and the third contactor is placed in a closed state, and when no abnormality occurs in the connection wire between the first contactor and the second contactor or the auxiliary machinery load connected to the connection wire, a voltage similar to the output voltage of the electricity storage device is measured by the voltage sensor. On the other hand, when abnormality occurs in at least one of the connection wire between the first contactor and the second contactor and die auxiliary machinery load connected to the connects on wire, for example, when an abnormality, such as layer short, occurs, since the resistor connected in series to the third contactor hears the output voltage of the electricity storage device, an abnormal voltage which is sufficiently lower than the output voltage of the electricity storage device is measured. Therefore, it is possible to determine whether or not an abnormality occurs on the vehicle side while reducing the number of current sensors.

With the vehicle according to the aspect (3) of the invention, in addition to the effects of the vehicle of (1) and (2), when it is determined that the voltage of the connection wire is not an abnormal voltage, the second contactor and the third contactor are placed in an open state, and the first contactor is placed in a closed state, and, for example, when an abnormal current which largely exceeds a dark current by the auxiliary machinery load is measured by the current sensor, it is possible to determine that abnormality occurs of the vehicle side in which the voltage of the connection wire does not drop. On the other hand, when an abnormal current is not measured, since no abnormality occurs at the vehicle, it is possible to determine that the abnormality occurred m the external power supply. Therefore, it is possible to determine whether the abnormal part is on the vehicle or the external power supply, while reducing the number of current sensors.

With the vehicle according to the aspect (4) of the invention, in addition to the effects of the vehicle of (1) and (2), when it is determined that abnormality occurs on the vehicle side, the second contactor and the third contactor are placed in an open state, the first contactor is placed in a closed state, and the auxiliary machinery load is activated, whereby power is supplied from the electricity storage device to the auxiliary machinery load. At this time, when a voltage drop of the connection wire is measured by the voltage sensor, it is possible to determine that the auxiliary machinery load is abnormal With the vehicle according to the aspect (5) of the invention, in addition to the effects of the vehicle of at least (1), the current to be consumed by the auxiliary machinery load can be measured by the auxiliary machinery current consumption measurement unit effectively using the current sensor provided at the input side of the auxiliary machinery load in advance. For this reason, it is possible to estimate tire inflow current into the vehicle without causing an increase in the number of components.

With the vehicle according to the aspect (6) of the invention, in addition to at the effects of the vehicle of at least (1), even when the current sensor is not provided at the input side of the auxiliary machinery load, the current to be consumed by the auxiliary machinery load can be measured by the auxiliary machinery current consumption, measurement unit based on the output current of the auxiliary machinery load and the efficiency map based on the output current and the output voltage of the auxiliary machinery load. For this reason, it is possible to estimate the inflow current into the vehicle without causing an increase in the number of components.

DESCRIPTION OF EMBODIMENT

Figure 1:
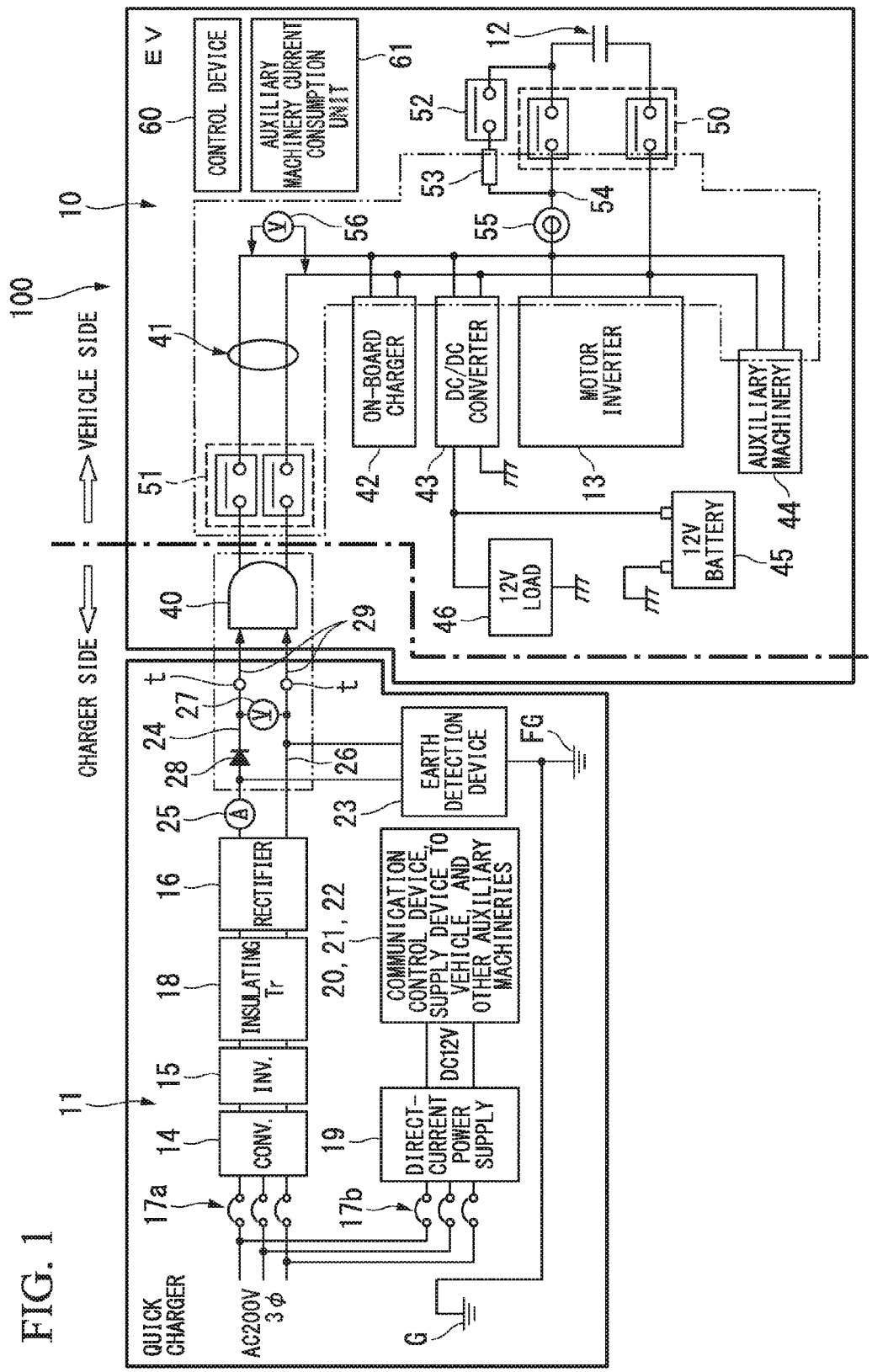
FIG. 1 is a diagram showing the schematic configuration of an external charging system of an electric vehicle and a quick charger according to an embodiment of the invention.

A vehicle according to an embodiment of the invention will be described referring to the drawings.

FIG. 1 shows an external charging system 10 of an electric vehicle 100 which is a vehicle of this embodiment and a quick charger 11 which supplies power to the external charging system 10.

The electric vehicle 100 of this embodiment includes a driving motor (not shown), such as a DC brushless motor, in which a driving shaft (not shown) is connected to driving wheels (not shown) through a gear box (not shown) or the like, and a high-voltage battery 12 which supplies power to the driving motor, and performs driving control of the driving motor by pulse width modulation or the like using a motor inverter 13 described below. The high-voltage battery 12 is referred to as "high-voltage" because the output voltage of the high-voltage battery is higher than the output voltage (or output voltage value) (for example, 12 V) of a battery 45 described below.

The quick charger 11 is an external power supply which charges the high-voltage battery 12 mounted on the vehicle. The quick charger 11 performs direct current converts to the received three-phase 200 V by a converter (CONV) 14, causes oscillation with a desired voltage by an inverter (INV) 15, and re-outputs direct-current power rectified by a rectifier 16. A circuit breaker 17a is provided on the primary side of the converter 14. An insulating transformer (Tr) 18 is interposed between the inverter 15 and the rectifier 16 to insulate the primary side from the secondary side.

The quick charger 11 is configured such that a charging voltage and a charging current are adjustable. For example, the charging voltage and the charging current are adjusted in accordance with information regarding an instruction value of a charging voltage or a charging current which are received from the electric vehicle 100, whereby optimum quick charging can be performed for electric vehicles including various types (specifications) of external charging systems.

An earth detection device 23 which detects an earth fault on the output side of the rectifier 16 is provided in the quick charger 11, and it is configured that quick charging is stopped when an earth fault is detected by the earth detection device 23. The earth detection device 23 is connected to a positive power supply line 24 and a negative power supply line 26 on the output side of the rectifier 16, and detects an earth fault by comparing the current (or current value) flowing in the positive power supply line 24 with the current flowing in the negative power supply line 26.

The earth detection device 23 is connected to a frame ground FG of the quick charger 11, and the frame ground FG of the quick charger 11 is connected to a ground electrode G.

A direct-current ammeter 25 which measures the current flowing in the positive power supply fine 24 is provided in the positive power supply line 24 on the output side of the rectifier 16, and a direct-current voltmeter 27 which measures the voltage (or voltage value) across output terminals t-t of the quick charger 11 is provided between the positive power supply line 24 and the negative power supply line 26. The measurement results of the direct-current ammeter 25 and the direct-current voltmeter 27 are transmitted to the electric vehicle 100 through a communication control device 20 which performs communication with the electric vehicle 100. A diode 28 in which the forward deletion of the diode is in the direction toward the output terminal t is disposed in the path of the positive power supply line 24 which is between, the output terminal t and the direct-current ammeter 25. A charging cable 29 which includes a power supply connector (not shown) at an end portion is connected to the output terminals t of the quick charger 11.

A direct-current, power supply 19 which converts three-phase 200 V to direct-current power (for example, DC 12 V) having a voltage lower than the output of the rectifier 16 is provided in the quick charger 11 separately from the system for charging. Direct-current powder which is output from, the direct-current power supply 19 is supplied to a communication control device 20, a supply device 21 which performs supply control of direct-current power to the electric vehicle 100 (vehicle), and other auxiliary machineries 22 which are provided at the quick charger 11. Similarly to the system for charging, a circuit breaker 17b is provided at the power receiving side of the direct-current power supply 19.

The electric vehicle 100 includes an external charging system 10 which charges the high-voltage battery 12 with power supplied from the quick, charger 11. The external charging system 10 includes a power receiving connector 40 to which a power supply connector of the quick charger 11 can be electrically connected, and a pair of high-voltage connection wires 41 which connect the power receiving connector 40 and the high-voltage battery 12.

An on-hoard charger 42, a DC/DC converter 43, a motor inverter 13, and other auxiliary machinery loads (air conditioner inverter or the like) 44 serving as auxiliary machinery loads are branch connected to the high-voltage connection wires 41.

The on-board charger 42 is a charging device which charges the high-voltage battery 12 with power supplied from a comparatively low single-phase 100 V household wall, outlet or the like of. In general, charging by the on-board charger 42 requires a charging time longer, than quick charging by the quick charger 11. A rectifying capacitor (not shown) is provided at a high-voltage side in an internal circuit (not shown) of the on-board charger 42, and a discharging resistor (not shown) for electric shock prevention during maintenance is connected in parallel to the rectifying capacitor (hereinafter, the same applies to the DC/DC converter 43 and the motor inverter 13).

The DC/DC converter 43 steps down and outputs the voltage of the high-voltage connection wire 41 so as to charge a low-voltage (for example, 12 V) battery (1.2 V battery) 45 lower than the voltage of the high-voltage battery 12 or to driven low-voltage load (12 V load) 46.

The motor inverter 11 includes a PWM inverter (not shown) using pulse width modulation (PWM) which includes a bridge circuit bridged using a plurality of switching elements, such as IGBT. The motor inverter 13 receives a control instruction from a control device 61) described below to control driving and power generation of the driving motor. In the electric vehicle 100, as well as charging from the external power supply, the high-voltage battery 12 is chargeable with power output from the driving motor during power generation by a regeneration operation.

Other auxiliary machinery loads 44 are, for example, loads, such as an inverter of a car air conditioner (A/C).

A first contactor 50 which is opened and closed in accordance with a control instruction of the control device 60 and connects or disconnects the positive high-voltage connection wire 41 and the negative high-voltage connection wire 41 is provided near the high-voltage, battery 12 of the high-voltage connection wires 41. Similarly to the first contactor 50, second contactor 51 which is opened and closed in accordance with a control instruction of the control device 60 and connects or disconnects the positive high-voltage connection wire 41 and the negative high-voltage connection wire 41 is provided near the power receiving connector 40.

A third contactor 52 which is opened and closed in accordance with a control instruction of the control device 60 bypasses and is connected (in parallel) to the first contactor 50. A current limiting resistor 53 is connected in series to the third contactor 52. The third contactor 52 precharges a capacitive constituent member, such as a capacitor, of each of the on-board charger 42, the DC/DC converter 43, the motor inverter 13, and other auxiliary machinery loads 44. For example, the third contactor 52 is controlled to be closed immediately before the first contactor 50 or the second contactor 51 is input from a state where power is not supplied to the high-voltage connection wires 41. Accordingly, power is supplied from the high-voltage battery 12 to the on-board charger 42, the DC/DC converter 43, the motor inverter 13, and other auxiliary machinery loads 44 through the resistor 53, When precharging is performed, only a contact provided at the negative high-voltage connection wire 41 of the first contactor 50 is controlled to be closed so as to form a return circuit to the high-voltage battery 12.

In the external charging system 10, a current sensor 55 which measures an inflow current into the high-voltage battery 12 and an outflow current from the high-voltage battery 12 (or an inflow current value and an outflow current value) is attached to the high-voltage connection wire 41 near a merging portion 54 where the first connector 50 and the third contactor 52 are merged and connected together. The measurement result of the current sensor 55 is input to the control device 60. The attachment position of the current sensor 55 is not hunted to the above-described position insofar as the inflow current into the high-voltage battery 12 and the outflow current from the high-voltage battery 12 can be measured, and for example, the current sensor 55 may be disposed in the negative high-voltage connection wire 41 or may be disposed on the high-voltage battery 12 side front the first contactor 50 and the third contactor 52. As the current sensor 55, a current transformer, such as a noncontact sensor, is preferably used.

A voltage sensor 56 which measures a voltage across the positive high-voltage connection wire 41 and the negative high-voltage connection wire 41 is attached to the high-voltage connection wires 41, and the measurement result is input to the control device 60.

The external charging system 10 includes, an auxiliary machinery current consumption measurement unit 61 which measures a current to be consumed by the on-hoard charger 42, the DC/DC converter 43, the motor inverter 13, and other auxiliary machinery loads 44 during quick charging.

The operation of the motor inverter 13 or the on-board charger 42 is stopped during quick charging, and since the current value of the current to be consumed by the motor inverter 13 or the on-board charger 42 during quick charging substantially becomes equal to a current value flowing in discharge resistance for a capacitor, the auxiliary machinery current consumption measurement unit 61 obtains the current to be consumed by the motor inverter 13, that is, the inflow current flowing into the motor inverter 13 by Impression (1).

$$\text{inflow current} = \text{input voltage}/\text{discharge resistance} \quad (1)$$

While there is a dark current other than the current flowing in the discharge resistance depending on the circuit configuration of the motor inverter 13, in this case, inflow current=input voltage/discharge resistance+dark current. The input voltage is equal to the voltage of the high-voltage connection wire 41.

The auxiliary machinery current consumption measurement unit 61 obtains the current value of the current to be consumed by the DC/DC converter 43 by the primary side current sensor. In general, while a current sensor (not shown) which measures a current flowing from the primary side, that is, the high-voltage connection wire 41 side is built in the DC/DC converter 43, when the primary side current sensor is not provided at the DC/DC converter 43, as a second method, for example, the current consumption is obtained by Expression (2) using the voltage (DC 12 V) on the secondary side, that is, or the output side of the DC/DC converter 43, the current on the output side of the DC/DC converter 43, a high-voltage side input voltage, and an efficiency map of the DC/DC converter 43 stored in a nonvolatile memory or the like in advance. In general, since a current sensor and a voltage sensor are built in the output side of the DC/DC converter 43, when the second method is used, the output current (or output current value) and the output voltage are measured by the output side current sensor and the output side voltage sensor.

$$I\text{in}=V\text{out}\times I\text{out}/(\text{Eff}\times V\text{in}) \quad (2)$$

Here, "Iin" is an inflow current [A] into the DC/DC converter 43. "Vout" is an output voltage [V] of the DC/DC converter 43, "Iout" is an output current [A] of the DC/DC converter 43, "Eff" is conversion efficiency [%] of the DC/DC converter 43, and "Vin" is an input voltage [V] of the DC/DC converter 43.

TABLE 1

DC/DC CONVERTER EFFICIENCY MAP

| | | OUTPUT CURRENT Iout | | | |
|---|---|---|---|---|---|
| | | 1 A | 2 A | 3 A | X A |
| OUTPUT VOLTAGE Vout | 8 V | 80% | 82% | 84% | 90% |
| | 10 V | 82% | 85% | 87% | 91% |
| | X V | 84% | 88% | 90% | 94% |

Although a case where the current (inflow current) to be consumed by the DC/DC converter 43 is calculated by the auxiliary machinery current consumption measurement unit 61 has been described, when the current to be consumed by the DC/DC converter 43 during charging has an extremely small value (for example, about 1 to 2 A) having no effect on abnormality detection, the current consumption is negligible just as error in the current consumption of the entire auxiliary machinery load or may be constantly processed as given current consumption.

In regard to the current to be consumed by other auxiliary machinery loads 44, similarly to the current to be consumed by the on-board charger 42, the motor inverter 13, and the DC/DC converter 43, the auxiliary machinery current consumption measurement unit 61 obtains the current to be consumed by other auxiliary machinery loads 44, such as an air conditioner inverter, based, on discharge resistance or the input current. Among other auxiliary machinery loads 44, in regard to an auxiliary machinery load whose output power is known, the current consumption is obtained by Expression (3) referring to the output current the input current, and the following efficiency map of other auxiliary machinery loads 44.

$$I\text{in}=W\text{out}/(\text{Eff}\times V\text{in}) \quad (3)$$

Here, "Iin" is an inflow current [A] into other auxiliary machinery loads 44 "Wout" is output power [W] of other auxiliary machinery loads 44, "Eff" is efficiency [%] of other auxiliary machinery loads 44, and "Vin" is an input voltage [V] of other auxiliary machinery loads 44.

TABLE 2

OTHER AUXILIARY MACHINERY (A/C INV) EFFICIENCY MAP

| | | OUTPUT POWER Wout | | | |
|---|---|---|---|---|---|
| | | 3 kW | 4 kW | 5 kW | X kW |
| INPUT VOLTAGE Vin | 300 V | 80% | 82% | 84% | 90% |
| | 350 V | 82% | 85% | 87% | 91% |
| | X V | 84% | 88% | 90% | 94% |

The auxiliary machinery current consumption measurement unit 61 obtains the total current (hereinafter, referred to as auxiliary machinery current consumption) m be consumed by the on-board charger 42, the DC/DC converter 43, the motor inverter 13, and other auxiliary machinery loads 44, and outputs information regarding the auxiliary machinery current consumption to the control device 60.

The control device 60 is an arithmetic device winch executes various programs stored in a storage device (not shown) in advance, and performs control of the external charging system 10 or the like based on various kinds of information input irons the current sensor or the like.

Figure 2:
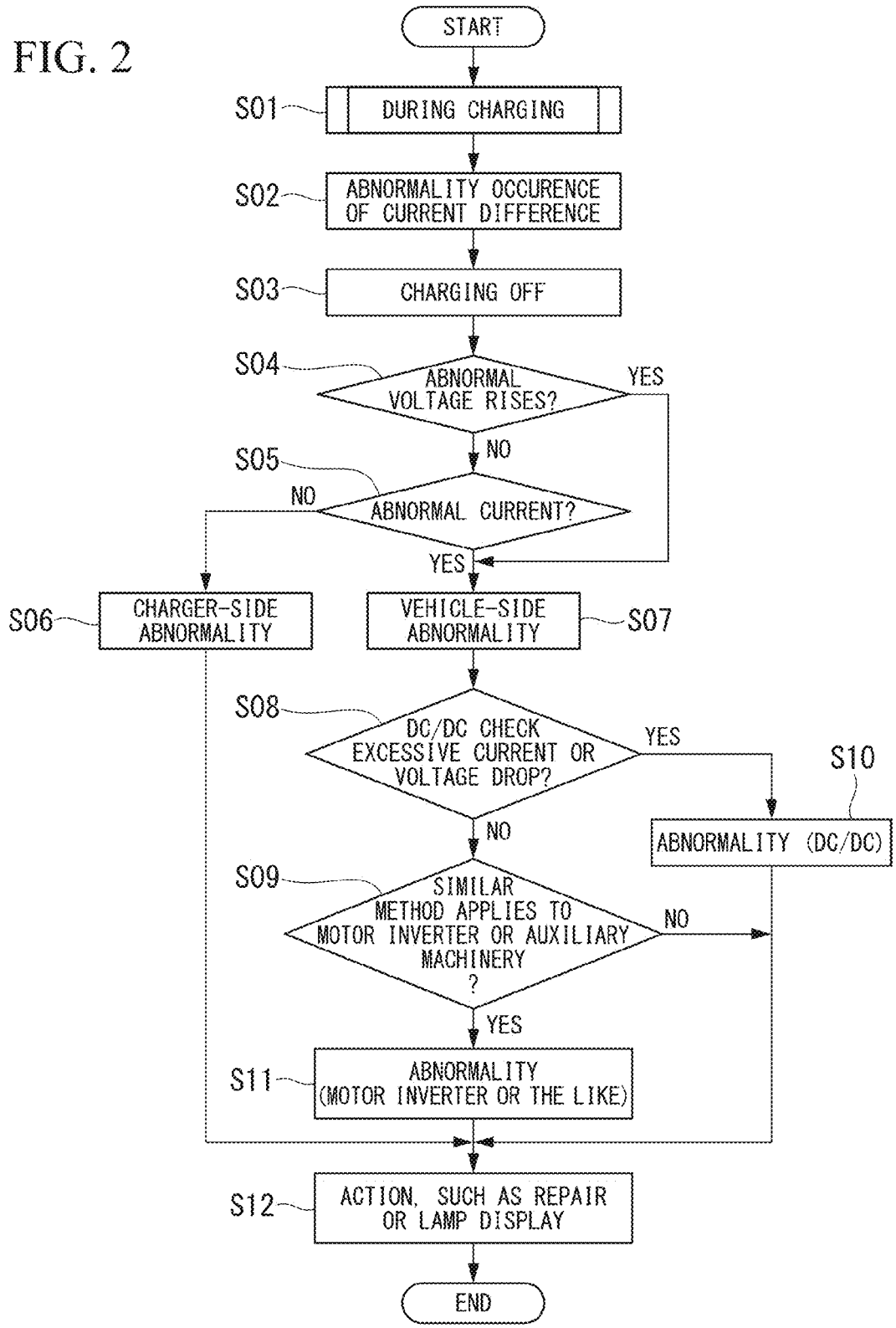
FIG. 2 is a flowchart of abnormality determination processing, which is executed by a control device in this embodiment.

Next, abnormality determination processing which is performed by the control device 60 of the electric vehicle 100 will be described referring to a flowchart of FIG. 2.

First, if the power supply connector of the quick charger 11 is connected to the power receiving connector 40 of the electric vehicle 100, the control device 60 performs precharging and then starts charging while placing the first contactor 50 and the second contactor 51 in a closed state and the third contactor 52 in an open state (Step S01). Next, the current measured by the current sensor 55 and the auxiliary machinery current consumption measured by the auxiliary machinery current consumption measurement unit 61 are added to estimate the inflow current flowing front the quick charger 11 through the power receiving connector 40, it is determined whether or not deviation between the estimated inflow current and the current measured by the ammeter of the quick charger 11 is greater than a predetermined current (for example, about 12 A) set in advance so as to detect abnormality, and when it is determined that deviation is greater than the predetermined current, it is determined that abnormality occurs (Step S02).

Figure 3:
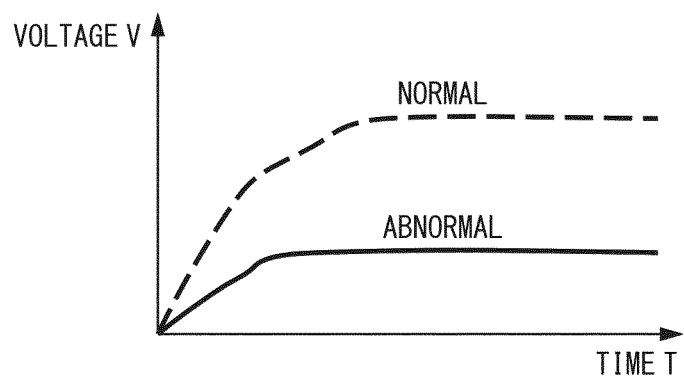
FIG. 3 is a graph showing change in voltage of a high-voltage connection wire when precharging is executed.

If it is determined that abnormality occurs, the control device 60 turns off quick charging, specifically, controls all of the first contactor 50, the second contactor 51, and the third contactor 52 in the open state (Step S03). Thereafter, the third contactor 52 is placed in the closed state to perform precharging, and it is determined whether or not the voltage measured by the voltage sensor 56 is lower than, a predetermined voltage set in advance so as to detect abnormality (Step S04). FIG. 3 is a graph in which the vertical axis represents the voltage measured by the voltage sensor 56, and the horizontal axis represents the time from the start of precharging, and for example, when an abnormality, such as layer short, occurs in the high-voltage system on the vehicle (in FIG. 3, indicated by a solid line), the voltage does not rise (abnormal voltage rise), and becomes a voltage lower than the normal state (in FIG. 3, indicated by a broken line).

When the determination result shows that the voltage is not lower than the predetermined voltage (No in Step S04), control is performed such that the second contactor 51 and the third contactor 52 are placed in the open state, and the first contactor 50 is placed in the closed state, and it is determined whether or not the current by the current sensor 55 is greater than a predetermined current set in advance so as to determine an abnormal current (Step S05). When the determination result shows that the current is not greater than the predetermined current (No in Step S05), it is determined that abnormality occurs on the charger side (Step S06) lamp display or the like of abnormality of the quick charger 11 is performed (Step S12), and a sequence of processing described above ends once. In the abnormality determination processing, from the quick charger 11 side to the power receiving connector 40 of the second contactor 51 is the charger side, and from the high-voltage battery 12 side to the second contactor 51 is the vehicle side.

When the determination results show that the voltage is lower than the predetermined voltage (Yes in Step S04) and drat the current is greater than the predetermined current (Yes in Step S05), it is determined that abnormality, such as layer short occurs on the vehicle (Step S07).

Next, in order to check an abnormal part on the vehicle, the second contactor 51 and the third contactor 52 are placed in the open state, the first contactor 50 is placed in the closed state, and the driving of the DC/DC converter 43 starts (OFF→ON). At this time, it is determined whether or not an excessive current greater than the predetermined current flows from the measurement result of the current sensor 55, or it is determined whether or not voltage drop occurs in the high-voltage connection wire 41 from the measurement result of the voltage sensor 56 (Step S08). When the determination result shows that an excessive current flows or a voltage drop occurs (Yes in Step S08), it is determined, that the DC/DC converter 43 is abnormal (Step S10), lamp display or the like which requests the repair of the DC/DC converter 43 is abnormal (Step S12), and a sequence of processing described above ends once. When it is determined that the DC/DC converter 43 is abnormal, the driving of the DC/DC converter 43 is stopped.

When the determination result shows that no excessive current flows or no voltage drop occurs (No in Step S08), similarly to the DC/DC converter 43, the motor inverter 13 or other auxiliary machinery loads 44 is driven separately, and it is determined whether or not an excessive current or a voltage drop occurs (Step S09), When it is determined that an excessive current Doses or a voltage drop occurs (Yes in Step S09), it is determined, that abnormality occurs in the motor inverter 13 or an auxiliary machinery during driving (Step S11), lamp display or the like which requests the repair is performed (Step S12), and a sequence of processing described above ends once. When it is determined in Step S09 that no abnormality occurs in the motor inverter 13 or other auxiliary machinery loads 44, lamp display Or the like to the effect that abnormality occurs is performed (Step S12).

Figure 4:
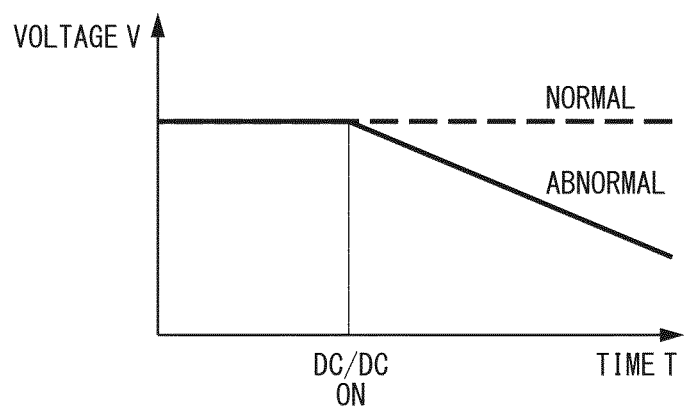
FIG. 4 is a graph showing change in voltage of a high-voltage connection wire when only a DC/DC converter is driven with power of a high-voltage battery.

FIG. 4 is a graph, in which the vertical axis represents the voltage measured by die voltage sensor 56 wherein the horizontal axis represents the time, and shows change in voltage between the high-voltage connection wires 41 when the second contactor 51 and the third contactor 52 are placed in the open state, the first contactor 50 is placed in the closed state, and the DC/DC converter 43 is driven. When an abnormality, such as layer short, occurs in the DC/DC converter 43 only during driving, the voltage drops (in FIG. 4, indicated by a solid line) with respect to the voltage (in FIG. 4, indicated by a broken line) in the normal state due to the driving of the DC/DC converter 43, and the voltage is lower than the normal state.

Accordingly, according to the electric vehicle of the foregoing embodiment, the inflow current from the quick charger 11 is estimated using the current sensor 55 and the auxiliary machinery current consumption measurement unit 61, whereby a dedicated current sensor which detects the inflow current from the quick charger 11 can be omitted. For this reason, it is possible to suppress the number of components to suppress an increase in costs, to achieve reduction in weight, and to reliably detect an abnormality on the vehicle.

When deviation between information regarding the current value of the current flowing out from the quick charger 11 and the estimated value of the inflow current is greater than or equal to a predetermined value, the first contactor 50 and the second contactor 51 are placed in the open state, and the third contactor 52 is placed in the closed state. In this way, when no abnormality occurs in the high-voltage connection wires 41 between the first contactor 50 and the second contactor 51 or the auxiliary machinery loads connected to the high-voltage connection wires 41, a voltage similar to the output voltage of the high-voltage battery 12 is measured by the voltage sensor 56. When abnormality occurs in at least one of the high-voltage connection wires 41 between the first contactor 50 and the second contactor 51 and the auxiliary machinery loads connected to the high-voltage connection wires 41, for example, when layer short, occurs, the resistor 53 connected in series to the third contactor 52 bears the output voltage of the high-voltage battery 12, a voltage which is sufficiently lower than the output voltage of the high-voltage battery 12 is measured by the voltage sensor 56 as an abnormal voltage, thereby it is able to reducing the number of current sensors and determining that abnormality occurs on the vehicle.

When it is determined that the voltage across the high-voltage connection wires 41 is not abnormal, the second contactor 51 and the third contactor 52 are placed in the open state, and the first contactor 50 is placed in the closed state. When, an abnormality occurs in which the voltage of the high-voltage connection wires 41 does not drop, and when an abnormal current which apparently exceeds a dark current by the on-board charger 42, the DC/DC converter 43, the motor inverter 13, and other auxiliary machinery loads 44 is measured by the current sensor 55, it can be determined that there is abnormality on the vehicle. In the other hand, when an abnormal current is not measured, since there is no abnormality on the vehicle, it can be determined that there is abnormality on the quick charger 11. As a result, it is possible to reduce the number of current sensors and to determine that an abnormal place is on the vehicle or the quick charger 11.

When it is determined that abnormality occurs on the vehicle, both the second contactor 51 and the third contactor 52 are placed in the open state, the first contactor 50 is placed in the closed state, and the on-board charger 42, the DC/DC converter 43, the motor inverter 13, and other auxiliary machinery loads 44 are activated. In this way, power is supplied from the high-voltage battery 12 to the on-board charger 42, the DC/DC converter 43, the motor inverter 13, and other auxiliary machinery loads 44. At this time, when a voltage drop across the high-voltage connection wires 41 is measured by the voltage sensor 56, it can be determined that there is an abnormality in any of the on-hoard charger 42, the DC/DC converter 43, the motor inverter 13, and other auxiliary machinery loads 44.

Furthermore, the current to be consumed by each of the on-board charger 42, the DC/DC converter 43, the motor inverter 13, and other auxiliary machinery loads 44 can be measured effectively using the current sensor provided at the input side of each of the on-board charger 42, the DC/DC converter 43, the motor inverter 13, and other auxiliary machinery loads 44 in advance. For this reason, it is possible to estimate the inflow current into the vehicle without causing an increase in the number of components.

Even when no current sensor is provided at the input side of each of the on-board charger 42, the DC/DC converter 43, the motor inverter 13, and other auxiliary machinery loads 44, the current to be consumed by each auxiliary machinery load can be measured based on the output current of each of the on-board charger 42, the DC/DC converter 43, the tumor inverter 13, and other auxiliary machinery loads 44 and the efficiency map based on the output current and the output voltage. For this reason, it is possible to estimate the inflow current into the vehicle without causing an increase in the number of components.

The invention is not limited to the configuration of the foregoing embodiment and design changes may be made without departing from the scope of the invention.

Although to the electric vehicle 100 of the foregoing embodiment an example where the auxiliary machinery loads which are branch connected to the high-voltage connection wires 41 are the on-board charger 42, the DC/DC converter 43, the motor inverter 13, and other auxiliary machinery loads 44 has been described, the invention is not limited thereto, and auxiliary machinery loads other than those described above may be connected.

Industrial Applicability

According to the invention, the inflow current from the external power supply is estimated using the current sensor and the auxiliary machinery current consumption measurement unit, whereby a dedicated current sensor which detects the inflow current from the external power supply can be omitted. For this reason, it is possible to reduce the number of components to suppress an increase in costs, to achieve reduction in weight, and to reliably detect abnormality on the vehicle.

REFERENCE SIGNS LIST

10: external charging system
11: quick charger (external power supply)
12: high-voltage battery (electricity storage device)
40: power receiving connector (vehicle-side connectors
41: high-voltage connection wire (connection wire)
42: on-board charger (auxiliary machinery load)
43: DC/DC converter (auxiliary machinery load)
44: other auxiliary machinery loads (auxiliary machinery loads)
50: first contactor
51: second contactor
52: third contactor
53: resistor
55: current sensor
61: auxiliary machinery current consumption measurement unit
60: control, device

The invention claimed is:

1. A vehicle comprising:
a connection wire;
an electricity storage device;
an external charging system which charges the electricity storage device with power received from an external power supply through the connection wire;
at least one auxiliary machinery load which is connected to the connection wire;
a current sensor which measures an inflow current value into the electricity storage device and an outflow current value from the electricity storage device;
an auxiliary machinery current consumption measurement unit which measures a current value to be consumed by the auxiliary machinery load, wherein the auxiliary current consumption measurement Emit measures a current value to be consumed by all of the at least one auxiliary machinery load connected to the connection wire; and
a control device which estimates the inflow current value from the external power supply based on a measurement result of the current sensor and a measurement result of the auxiliary machinery current consumption measurement unit while the electricity storage device is being charged with power received from the external power supply.

2. A vehicle comprising:
a connection wire and an electricity storage device;
an electricity storage device;
an external charging system which charges the electricity storage device with power received from an external power supply through the connection wire;
an auxiliary machinery load which is connected to the connection wire;
a current sensor which measures an inflow current value into the electricity storage device and an outflow current value from the electricity storage device;
an auxiliary machinery current consumption measurement unit which measures a current value to be consumed by the auxiliary machinery load; and
a control device which estimates the inflow current value from the external power supply based on a measurement result of the current sensor and a measurement result of the auxiliary machinery current consumption measurement unit while the electricity storage device is being charged with power received from the external power supply;
a voltage sensor which measures a voltage value of the connection wire;
a first contactor which is provided between the electricity storage device and the connection wire;
a second contactor which is provided between a vehicle-side connector, to which the external power supply is connected, and the connection wire;
a resistor;

a third contactor which is connected in series to the resistor and provided to bypass the first contactor;

wherein the control device receives information regarding a current value of a current flowing out from the external power supply, when deviation between the current value and an estimated value of the inflow current is greater than or equal to a predetermined value, places the first contactor and the second contactor in an open state and the third contactor in a closed state and determines whether or not a voltage value of the connection wire is abnormal voltage, and when it is determined that the voltage value is abnormal voltage, determines that the vehicle side is responsible for occurrence of the abnormal voltage.

3. The vehicle according to claim 2, wherein, when it is determined that a voltage value of the connection wire is not an abnormal voltage, the control device places the second contactor and the third contactor in an open state and the first contactor in a closed state and determines whether or not a measured current of the current sensor is abnormal current, and when it is determined that the measured current is abnormal current, determines that the vehicle side is responsible for occurrence of the abnormal current.

4. The vehicle according to claim 2, wherein, when it is determined that abnormality occurs at the vehicle side, the control device places the second contactor and the third contactor in an open state and the first contactor in a closed state, activates the auxiliary machinery load, and determines whether or not a voltage value of the connection wire is abnormal voltage, and when it is determined that the voltage value is abnormal voltage, determines that the auxiliary machinery load is abnormal.

5. The vehicle according to claim 1, wherein the auxiliary machinery current consumption measurement unit measures a current value to be consumed by the at least one auxiliary machinery load based on a measurement result of a current sensor provided at an input side of the at least one auxiliary machinery load.

6. The vehicle according to claim 1, wherein the auxiliary machinery current consumption measurement unit measures a current value to be consumed by the at least one auxiliary machinery load based on an output current value of the at least one auxiliary machinery load and an efficiency map based on the output current value and an output voltage value.

7. The vehicle according to claim 2, wherein the auxiliary machinery current consumption measurement unit measures a current value to be consumed by the auxiliary machinery load based on a measurement result of a current sensor provided at an input side of the auxiliary machinery load.

8. The vehicle according to claim 3, wherein the auxiliary machinery current consumption measurement unit measures a current value to be consumed by the auxiliary machinery load based on a measurement result of a current sensor provided at an input side of the auxiliary machinery load.

9. The vehicle according to claim 4, wherein the auxiliary machinery current consumption measurement unit measures a current value to be consumed by the auxiliary machinery load based on a measurement result of a current sensor provided at an input side of the auxiliary machinery load.

10. The vehicle according to claim 2, wherein the auxiliary machinery current consumption measurement unit measures a current value to be consumed by the auxiliary machinery load based on an output current value of the auxiliary machinery load and an efficiency map based on the output current value and an output voltage value.

11. The vehicle according to claim 3, wherein the auxiliary machinery current consumption measurement unit measures a current value to be consumed by the auxiliary machinery load based on an output current value of the auxiliary machinery load and an efficiency map based on the output current value and an output voltage value.

12. The vehicle according to claim 4, wherein the auxiliary machinery current consumption measurement unit measures a current value to be consumed by the auxiliary machinery load based on an output current value of the auxiliary machinery load and an efficiency map based on the output current value and an output voltage value.

* * * * *